(12) United States Patent
Cassell

(10) Patent No.: US 8,221,251 B2
(45) Date of Patent: Jul. 17, 2012

(54) VARIABLE VOLUME BOOT

(75) Inventor: Robert Leslie Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 280 days.

(21) Appl. No.: 12/665,782

(22) PCT Filed: Jun. 25, 2007

(86) PCT No.: PCT/US2007/072010
§ 371 (c)(1), (2), (4) Date: Dec. 21, 2009

(87) PCT Pub. No.: WO2009/002335
PCT Pub. Date: Dec. 31, 2008

(65) Prior Publication Data
US 2010/0227699 A1    Sep. 9, 2010

(51) Int. Cl.
*F16D 3/84* (2006.01)
(52) U.S. Cl. ......... 464/173; 464/906; 277/315; 277/550
(58) Field of Classification Search .......... 464/173–175; 277/315, 635, 636, 926–928, 550
See application file for complete search history.

(56) References Cited

U.S. PATENT DOCUMENTS

| | | | |
|---|---|---|---|
| 1,514,942 A | * | 11/1924 | Whitten |
| 2,966,376 A | * | 12/1960 | Reynolds ..................... 277/550 |
| 4,392,838 A | | 7/1983 | Welschof et al. |
| 5,346,431 A | * | 9/1994 | Okuyama et al. ......... 464/173 X |
| 6,293,873 B1 | | 9/2001 | Iwano et al. |

FOREIGN PATENT DOCUMENTS

| | | |
|---|---|---|
| JP | 08-312666 A | 11/1996 |
| KR | 10-2002-0083825 A | 11/2002 |
| KR | 2002-0083825 A * | 11/2002 |

* cited by examiner

*Primary Examiner* — Gregory Binda
(74) *Attorney, Agent, or Firm* — Jennifer M. Brumbaugh; Mick A. Nylander; Rader, Fishman & Grauer PLLC

(57) ABSTRACT

An articulated joint includes a first rotational member and a second rotational member coupled with and positioned generally coaxial to the first rotational member. The joint also includes a boot. The boot is selectively deformable in response to an increase in pressure in a joint chamber to increase the volume of the joint chamber. The volume of the joint chamber is selectively changed due to, at least in part, relative movement of the boot end to the second rotational member.

20 Claims, 4 Drawing Sheets

VARIABLE VOLUME BOOT

TECHNICAL FIELD

The present invention generally relates to constant velocity joints with flexible boots.

BACKGROUND ART

Constant velocity joints (CV joints) are common components in vehicles. Constant velocity joints are often employed where transmission of a constant velocity rotary motion is desired or required. CV joints are typically greased or otherwise lubricated for the life of the component. The joints are sealed to retain the grease or lubricant inside the joint while keeping contaminants and foreign matter, such as water and dirt, out of the joint. Moreover, a sealing boot, which may be made of rubber, thermoplastic, silicone material, or the like, usually encloses the internal components of the CV joints thus closing an open end. Additionally, a second open end may also be enclosed with an internal cover to close off the CV joint from the contaminants.

During operation, a CV joint may create excess internal pressure in the inner chamber of the joint. This is usually the result of temperature, which may be generated during operation. In such instances, it is often desirable to vent pressurized gases from the chamber of the joint to the outer atmosphere to reduce the internal temperature of the joint. The venting prevents undesirable pressure build-up during operation of the joint that could damage or compromise components such as the sealing boot. Consequently, many CV joints include a means for venting. An example of known venting means include a small hole in the center of the grease cap. However, this venting technique may allow an unwanted release of the grease or lubricant and/or the introduction of contaminants into the joint.

A joint may also be sealed without a vent valve or other vent. However, the relative pressure differences created within the boot and joint assembly by thermal cycling may deform the boot beyond a desirable amount, thereby resulting in premature boot failure.

One-way valves have been used to vent internal pressure within a CV joint. However, these valves may result in a negative pressure (a value that is undesirably less than atmospheric) when the joint cools, and may result in an unacceptable amount of stress within the boot, leading to a premature boot failure.

In traditional CV joint assemblies, a small end of the boot or neck is secured at a shaft-mating portion to the shaft to prevent any relative movement therebetween. Relative movement between the shaft-mating portion of the boot and the shaft may wear the boot and/or the shaft and may result in sufficient wear to permit grease to undesirably escape the joint chamber, or may permit contaminants to undesirably enter the joint chamber.

Thus, a joint may allow grease or other lubricants to undesirably leak from joint chamber while permitting undesired contaminants to enter during normal operations. What is needed, therefore, is a constant velocity joint that can accommodate the pressure changes within a joint chamber of a joint assembly while reducing or eliminating any loss of lubricants and introduction of contaminants.

DISCLOSURE OF THE INVENTION

An articulated joint includes a first rotational member and a second rotational member coupled with and positioned generally coaxial to the first rotational member. The joint also includes a boot. The boot is selectively deformable in response to an increase in pressure in a joint chamber to increase the volume of the joint chamber. The volume of the joint chamber is selectively changed due to, at least in part, relative movement of the boot end to the second rotational member.

BRIEF DESCRIPTION OF DRAWINGS

The present invention will now be described, by way of example, with reference to the accompanying drawings. Components in the drawings are not necessarily to scale, emphasis instead being placed upon clearly illustrating the principles of the present invention. Moreover, in the drawings, like reference numerals designate corresponding parts throughout several views.

DETAILED DESCRIPTION

Figure 1:
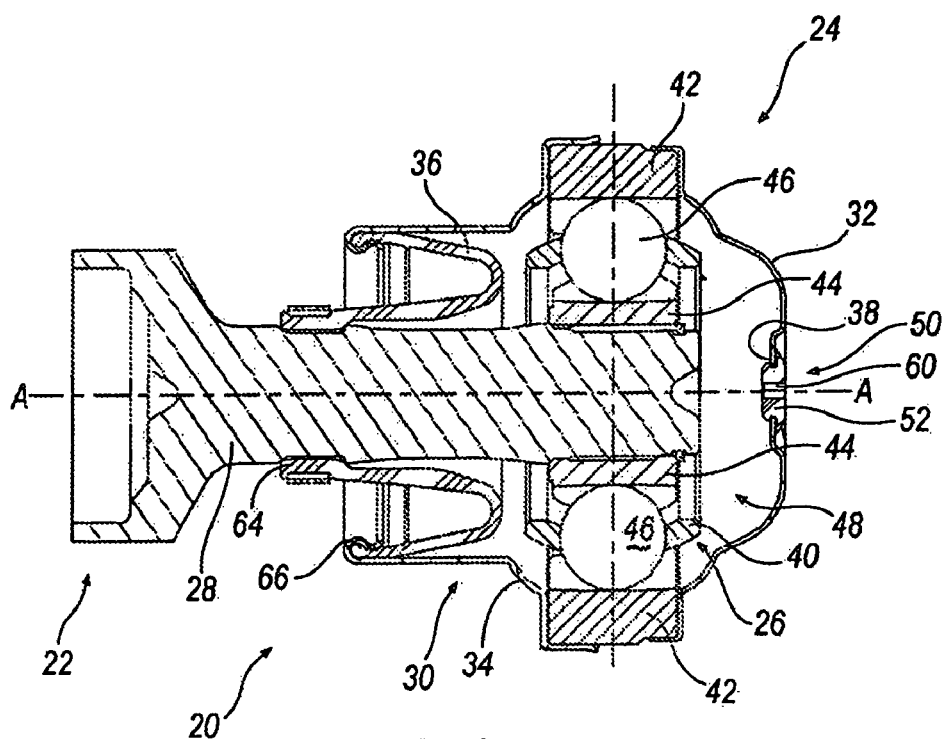
FIG. 1 is a partially sectioned view of a constant velocity joint.

Referring to the drawings, exemplary constant velocity joints are shown. The illustrated constant velocity joints and joint chambers may be fixed constant velocity joints of the monoblock style that may be used with a propeller shaft (propshaft) of a vehicle. It should be noted, however, that any type of constant velocity joints and constant velocity joint chambers, including without limitation, tripod, fixed tripod, or the like may be used in accordance with the present invention. That is, one of ordinary skill in the art will recognize the advantages realized by the invention in substantially all types of constant velocity joints, and, therefore the invention should not be limited to the illustrated embodiments.

FIG. 1 illustrates a prior art CV joint 20 having a central axis A-A. CV joint 20 includes driven end 22 and a driving end 24. CV joint 20 further includes a joint assembly 26 coupled to a shaft 28 with a boot cover assembly 30 connected therebetween. CV joint 20 further includes a grease cover 32 that seals the driving end 24. Boot cover assembly 30 includes a metal cover 34 and a flexible boot 36. A portion of metal cover 34 is crimped onto boot 36 for attachment thereto. Boot cover assembly 30 and grease cover 32 protect the moving parts of CV joint 20 during operation by retaining the grease or lubricant inside the joint while keeping contaminants and foreign matter, such as water and dirt, out of the joint assembly 26.

Grease cover 32 includes a vent valve aperture 38, as discussed in greater detail below.

Joint assembly 26 includes a cage 40, an outer race 42, an inner race 44, and a plurality of balls 46. Cage 40 retains balls 46 between the outer race 42 and the inner race 44 in a generally equally spaced circumferential orientation. Shaft 28 is splined to the inner race 44 to allow axial movement therebetween.

Collectively, at least the shaft 28, boot cover assembly 30, outer race 42, and the grease cover 32 form a joint chamber 48. Joint chamber 48 contains grease or other lubricant (not shown) for lubrication between cage 40, outer race 42, inner race 44, and balls 46. A vent valve 50 for equalizing pressure on either side of grease cover 32 is positioned within the vent valve aperture 38. Vent valve 50 includes a cylindrical body 52 having an aperture 60 formed therein.

Figure 2:
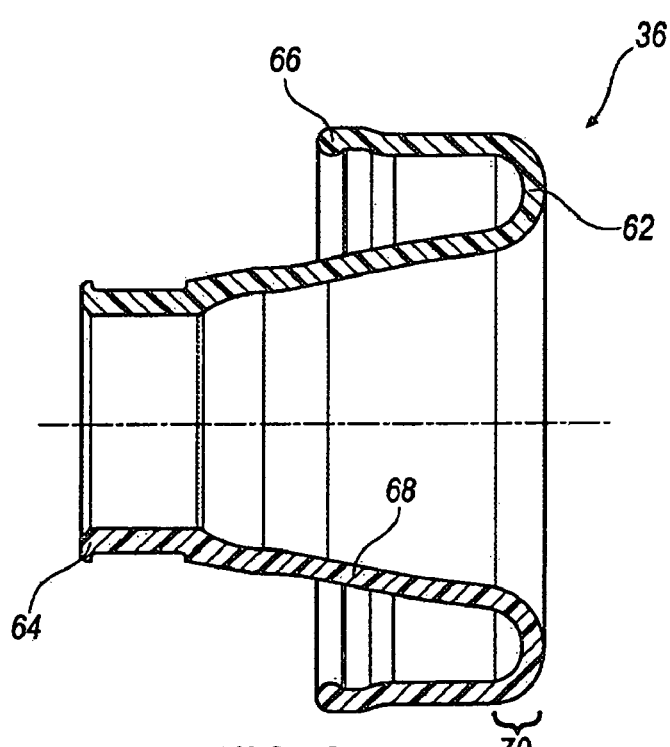
FIG. 2 is a sectional view of a boot for the joint of FIG. 1.

With continual reference to FIG. 1 and specific reference to FIG. 2, the boot 36 includes a contoured body of revolution 62 having a small end 64, a large end 66, a middle portion 68, and a curved portion 70. As illustrated in FIG. 1, the small end 64 is coupled to the shaft 28 and the large end 66 is crimped to the metal cover 34, which is, in turn, coupled to outer race 42. Small end 64 is axially secured to the shaft 28 with a conventional type of clamp connector or any other suitable means to restrict any relative axial movement between the small end 64 and the shaft 28.

During vehicle operation, CV joints 20 are typically heated due to the rotation and resulting friction between moving parts. Pressure within the joint chamber 48 typically increases due to the heat of operation, and the lubricants are typically softened and have a lower viscosity due to the heat. When a vehicle is parked on a relatively horizontal surface the shaft 28 is generally horizontal and the level of grease within joint chamber 48 is below the vent valve 50, allowing any excess pressure generated within joint chamber 48 to vent to the atmosphere while preventing the loss of lubricants through aperture 60. However, periodically, the vehicle may be parked on an incline resulting in the shaft 28 positioned at an angle relative to a horizontal plane, and the aperture 60 located below the level of lubricant within the joint chamber 48. When this occurs, grease or other lubricants may escape through the aperture 60.

Generally, when the CV joint 20 is rotating at high speed, the lubricants rotate with the joint and are forced outward from the axis A-A. During this dynamic operating condition, lubricants will typically not escape through aperture 60.

When the CV joint is operating at lower speeds, the force of gravity on a portion of the lubricant may overcome the angular momentum of the lubricant and cause the lubricant to slump toward the shaft 28. The lubricant may free-fall or migrate toward axis A-A. When this occurs, lubricant may escape through aperture 60.

When a joint, such as CV joint 20, is heated during operation and then permitted to cool, a vent, such as the aperture 60 in vent valve 50, which permitted air to escape during any pressure increase in the joint chamber 48, will permit air to enter the joint chamber 48 as the pressure within the joint chamber 48 falls below ambient pressure. However, this air entering the joint chamber 48 may bring entrained contaminants including moisture that may affect the operation of the joint. By way of example, moisture that enters the joint chamber 48 may react with the grease and drive a chemical reaction that undesirably changes the grease thereby degrading the properties of the grease.

Figure 3:
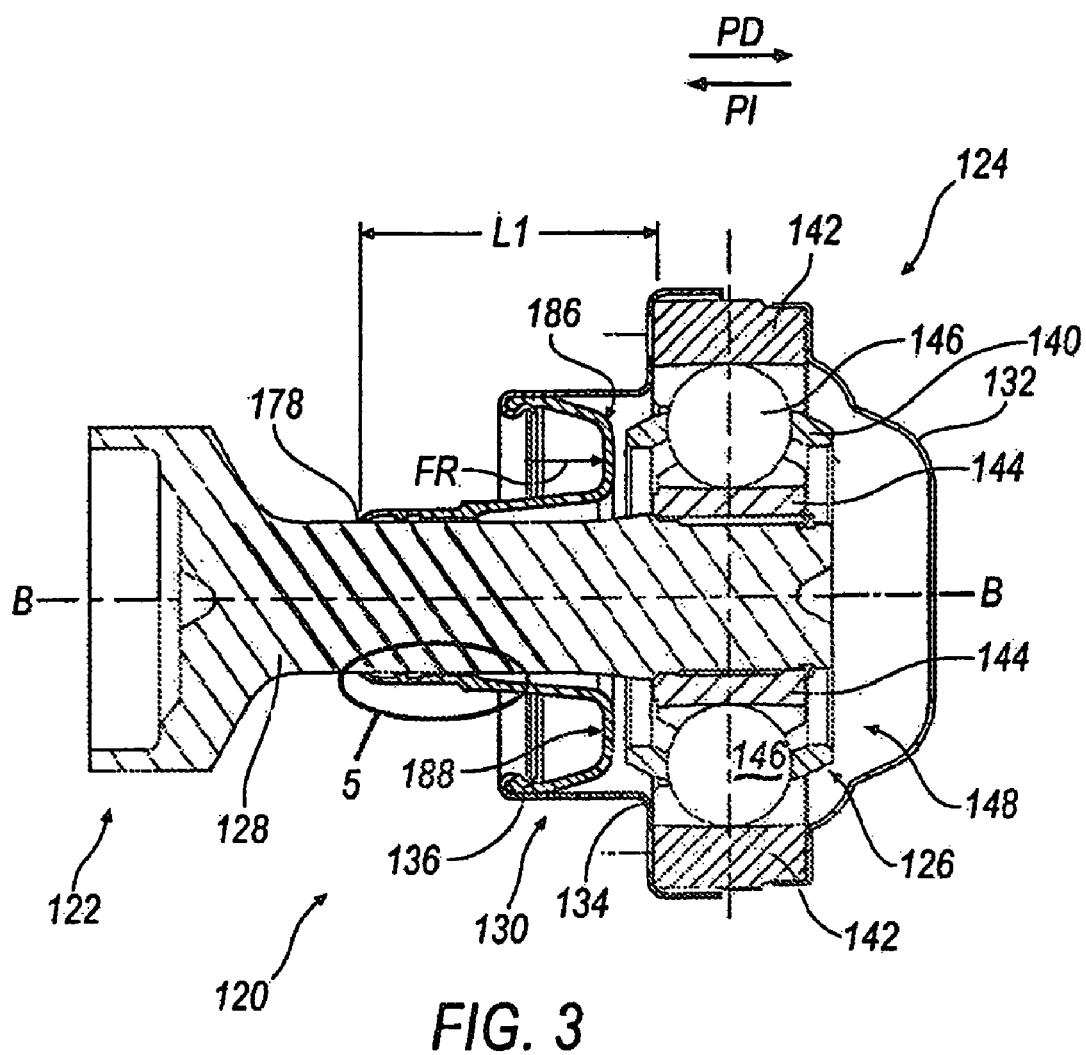
FIG. 3 is a partially sectioned view of a constant velocity joint according to an embodiment of the present invention.

FIG. 3 illustrates a CV joint 120 having a central axis B-B. CV joint 120 has a driven end 122 and a driving end 124. CV joint 120 further includes a joint assembly 126 that is coupled to a shaft 128. A boot cover assembly 130 is connected between the joint assembly 126 and the shaft 128. A grease cover 132 seals the driving end 124 of CV joint 120. Boot cover assembly 130 includes a metal cover 134 and a flexible boot 136. The shaft 128 is defined, in part, by a generally cylindrical shaft outer surface 138 (FIG. 5), as discussed in greater detail below.

Joint assembly 126 includes a cage 140, an outer race 142, an inner race 144, and a plurality of balls 146. As illustrated, shaft 128 is splined to inner race 144 and may be formed integrally to the inner race 144.

Collectively, at least the shaft 128, boot cover assembly 130, outer race 142, and the grease cover 132 form a joint chamber 148. The joint chamber 148 contains grease or other lubricant (not shown).

Figure 4:
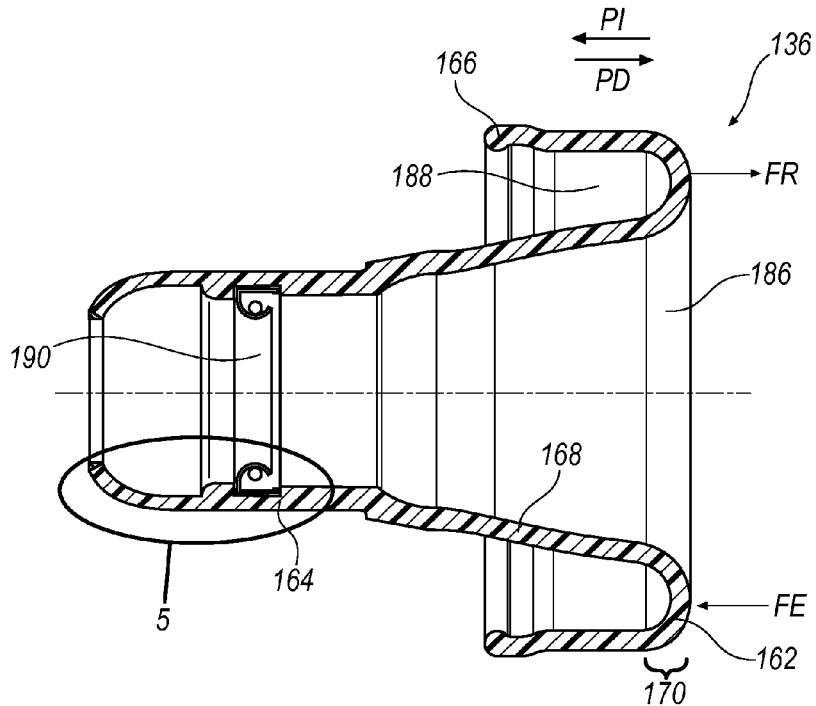
FIG. 4 is a sectional view of a boot for the joint of FIG. 3.

With continual reference to FIG. 3 and specific reference to FIG. 4, the boot 136 includes a contoured body of revolution 162 having a first portion, or a small end, 164, a large end 166, a middle portion 168, and a curved portion 170. As best illustrated in FIG. 3, the small end 164 is coupled to shaft 128 and large end 166 is crimped to metal cover 134, which is, in turn, coupled to outer race 142. While the boot 136 is illustrated with one hemi-torodial portion such as the curved portion 170, it will be understood that the boot 136 may also include a plurality of generally hemi-torodial portions, such as illustrated in commonly assigned U.S. patent application Ser. No. 11/452,150.

Figure 5:
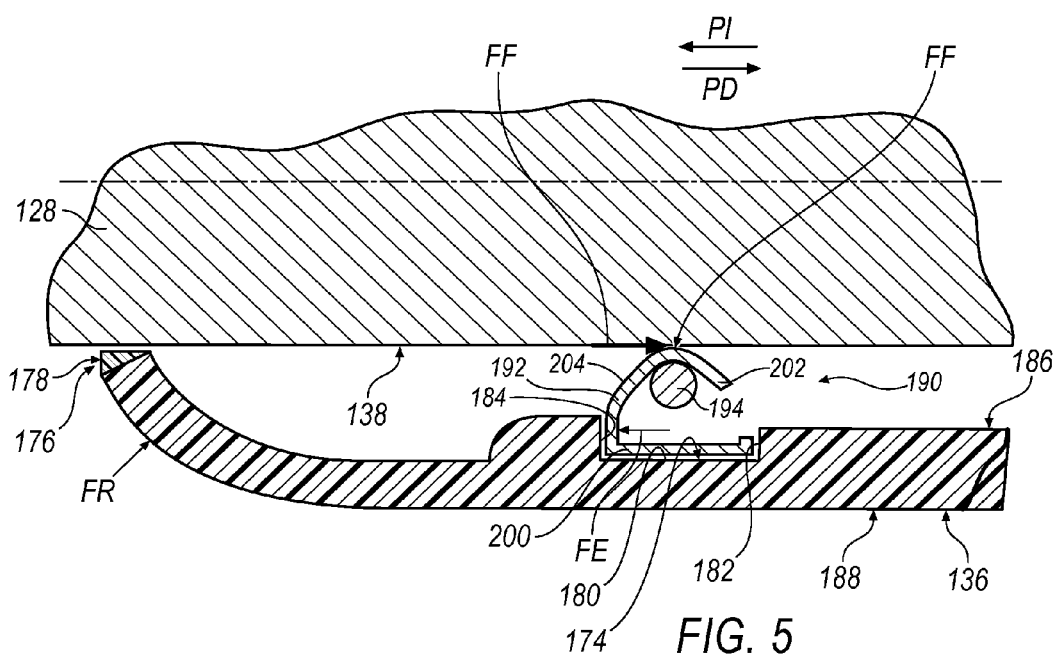
FIG. 5 is an enlarged sectional view of portion 5 of FIG. 3.

With specific reference to FIG. 5, the small end 164 includes a channel 174 formed therein and a scraper 176 extending therefrom to a small end surface 178. The channel 174 includes a generally cylindrical seal mating wall 180, a generally annular first seal retaining wall 182, and a generally annular second seal retaining wall 184. With reference to FIGS. 3-5, the boot 136 also includes an inside boot surface 186 and an outside boot surface 188.

The small end 164 is axially moveable relative to the shaft 128 and includes a radial shaft seal 190 interposed between the small end 164 and the shaft 128. The radial shaft seal 190 includes an annular seal body 192 and a tensioning member 194. The seal body 192 includes a generally cylindrical boot mating portion 200, a first sealing portion 202, and a second sealing portion 204. As illustrated in FIG. 5, the seal body 192 is coupled to the shaft 128 in an interference fit such that at least a portion of first sealing portion 202, and the second sealing portion 204 of the seal body 192 are outwardly deformed as the seal body 192 is installed onto the shaft 128.

As will be appreciated, articulation of the joint 120 where the axis of the shaft 128 is not co-axial with the axis of the outer race 142 may result in a change in the volume of the joint chamber 148. Movement between the small end 164 and the shaft 128 may reduce this change in volume of the joint chamber 148 during joint articulation to prevent an undesirable change in the pressure within the joint chamber 148.

Additionally, if a boot similar to the boot 136 is used on a plunging joint, joint plunge may affect the volume of the joint chamber 148 as the shaft moves axially relative to a outer race 142. Accordingly, movement between the small end 164 and the shaft 128 may reduce this change in volume of the joint chamber 148 during joint plunge to prevent an undesirable change in the pressure within the joint chamber 148.

FIG. 3 illustrates the CV joint 120 in a first configuration where the pressure within the joint chamber 148 is generally equal to the ambient (outside the joint chamber 148) pressure. In this first configuration, a distance between the outer race 142 and the small end surface 178 is illustrated as a distance L1.

Figure 6:
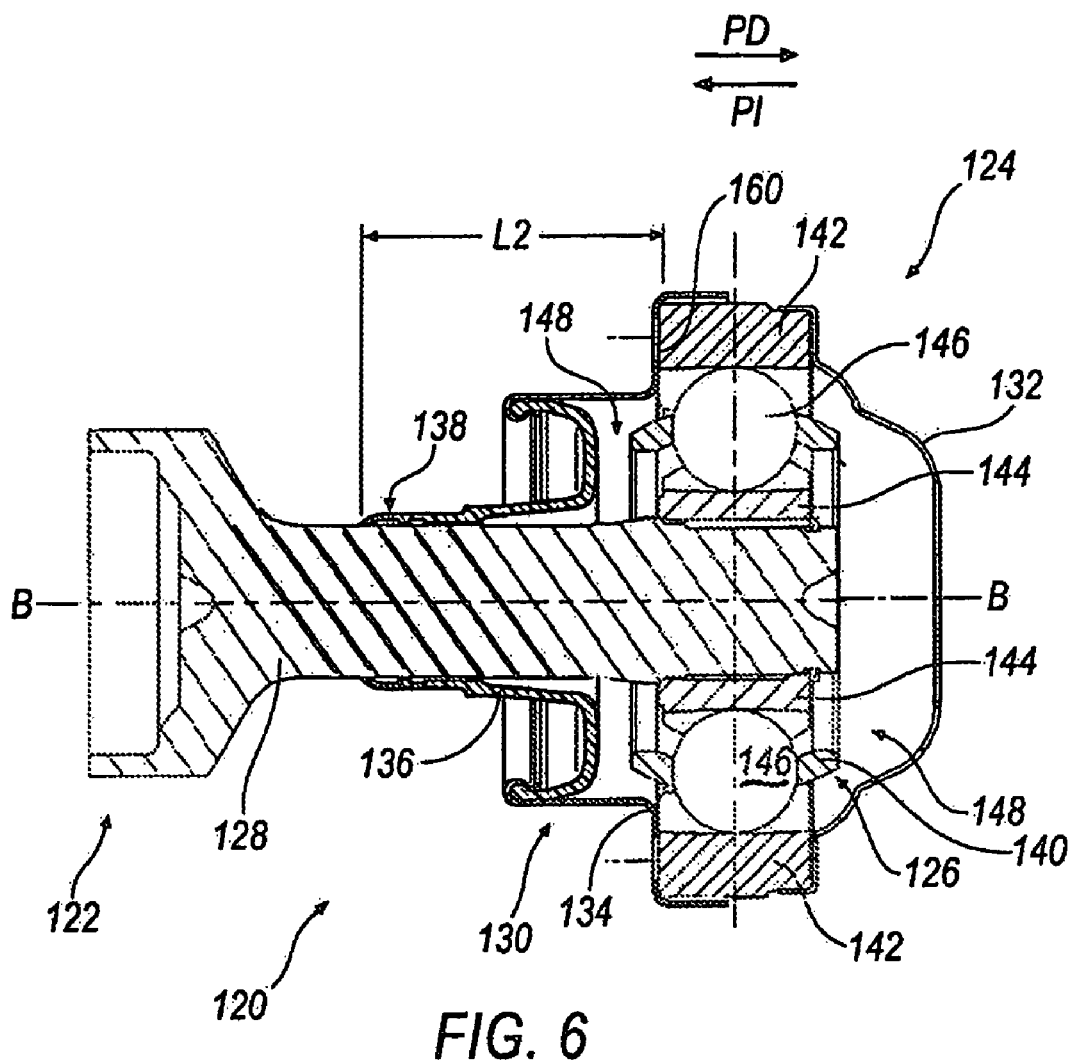
FIG. 6 is a partially sectioned view of the constant velocity joint of FIG. 3, illustrated in a second configuration.

FIG. 6 illustrates the CV joint 120 in a second configuration. In the second configuration, the joint chamber 148 has a greater volume than the volume of the joint chamber 148 in the first configuration. One explanation for the greater volume in the second configuration may be that fluids, such as air, within joint chamber 148 may have expanded due to heat during operation of the joint 120. In this second configuration, a distance between the outer race 142 and the small end surface 178 is illustrated as a distance L2. As illustrated, the distance L2 is greater than the distance L1.

During operation of CV joint 120, heat buildup in joint chamber 148 increases the temperature of the fluids (grease, air, and the like) contained within the joint chamber 148. As the temperature of these fluids increases, the pressure of these fluids within joint chamber 148 increases, due primarily to the expansion of the fluids that are gasses. This increased pressure is exerted on the boot 136, and results in a force FE acting on the inside boot surface 186 (and on the seal 190) that urges the small end 164 of the boot 136 to move in the direction of arrow PI. When the pressure within the joint chamber 148 rises sufficiently above the ambient pressure, the force FE (FIG. 5) increases. When the force FE increases above a magnitude required to overcome a frictional force FF (FIG. 5) between the seal 190 and the shaft 128, then the small end 164 of the boot 136 may move relative to the shaft 128 such that the boot 136 moves from the first configuration and toward the second configuration.

After operation of the CV joint 120, the temperature of CV joint 120 will typically lower to ambient temperature. As the temperature of the air within joint chamber 148 decreases, the pressure of this air decreases. As the pressure within the joint chamber 148 decreases, a return force FR (FIG. 3) (due to negative pressure within the joint chamber 148) is exerted on the boot 136 (generally at curved portion 170) generally in the direction of arrow PD (FIG. 6). As the pressure within the joint chamber 148 further decreases, the force FR will increase to a magnitude sufficient to overcome a frictional force between the seal 190 and the shaft 128. This return force FR will urge the small end 164 to move relative to the shaft 128 generally in the direction of the arrow PD. As the small end 164 moves relative to the shaft 128 generally in the direction of the arrow PD, the volume within the joint chamber 148 is decreased, thereby increasing the pressure within the joint chamber 148 to a pressure that is closer to ambient pressure.

As will be appreciated, the frictional force, FR, and FE are not constants, but vary with operation of the joint 120. That is, the frictional force may vary whether the force is generated due to a sliding or a static friction. The forces FR and FE necessarily change with a change in the pressure within the joint chamber as compared to the ambient pressure.

As mentioned previously, operation of CV joint 120 generally results in the lubricant within joint chamber 148 migrating away from axis B-B within CV joint 120 as a centrifugal force is imparted upon the lubricant. The lubricant will generally be held within the joint chamber 148 in an annular configuration that is positioned farthest from axis B-B by a centripetal force imparted to the lubricant by at least outer race 142, metal cover 134, and the outer portions of grease cover 132. In this annular configuration, the lubricant will contact balls 146 which are preferably constructed of a metal. As the lubricant tends to cling to metals, and balls 146 rotate along an axis generally parallel to axis B-B, a portion of the lubricant will generally be interposed between balls 146, cage 140, outer race 142, and inner race 144 during operation of CV joint 120.

During high-speed operation, the centrifugal force acting on the lubricant will generally be greater than the force due to gravity on the lubricant and thus prevent the lubricant from migrating toward axis B-B. In relatively slow-rotational operation, the force due to gravity acting on the lubricant may be sufficient to cause a portion of the lubricant to slump where a portion of the lubricant falls toward axis B-B during rotation of CV joint 120. This slumping may occur as a migration of lubricant along grease cover 132 toward axis B-B as CV joint 120 rotates, or may occur as a portion of lubricant clings to itself (tackifier) and releases from other portions of lubricant and/or CV joint 120 and is free to fall in a generally arcuate path toward axis B-B. Thus, during lower speed operation, a portion of the lubricant may migrate toward the axis B-B.

In a static, non-rotating, state, the CV joint 120 at ambient temperature will generally contain a lubricant that clings to both itself and internal portions of CV joint 120 such that the lubricant (typically grease) will not flow. During operation of CV joint 120, the lubricant may shear soften and experience a reduction in viscosity. This reduction in viscosity may cause the lubricant to flow more readily until the lubricant sufficiently cools after operation.

When CV joint 120 has been operated sufficiently to shear soften the lubricant (generally at an increased ambient temperature and under harsh operating conditions) and CV joint 120 is not rotating, a portion of the lubricant may flow from the annular position of operation (mentioned above) to lower portions of the joint chamber 148 as a result of the effects of gravity. As the lubricant flows, the level of the lubricant will preferably not reach the axis B-B when axis B-B is generally horizontal. When axis B-B is not horizontal, (such as, for example, when the vehicle is parked on an incline) the level of the lubricant may move closer to the axis B-B. At an extreme incline, where axis B-B is far from horizontal, the level of the heated, lower viscosity lubricant may flow toward axis B-B and reach a center portion of the grease cover 132.

The elimination of a vent valve within the joint 120 will restrain the fluids within the joint chamber 148 from escaping from the joint chamber 148 and will reduce or eliminate contaminants from entering the joint chamber 148. The relative movement between the small end surface 178 and the shaft 128 permits the pressure within the joint chamber 148 to equalize close to the ambient pressure, thereby preventing the pressure within the joint chamber 148 to increase or decrease to an undesired value.

In the embodiment illustrated the scraper 176 contacts the shaft surface 138, at least when the scraper 176 moves in the direction of the arrow PI, to move contaminants away from the shaft seal 190. However, the scraper may not be in constant contact with the outer shaft surface 138 at all times during operation, since the rotation of the joint 120 will tend to prevent the presence of solid or particulate contamination from accumulating on the shaft surface 138 (due to the angular acceleration). Additionally, the scraper 176 may be integrally molded on the boot 136, and/or may be constructed of a different material than the boot, such as a high density polyethylene (HDPE) or other suitable material.

The joint 120 may be sealed with a predetermined amount of grease or other lubricant. With the elimination of a vent valve, the lubricant within the joint 120 may have a nitrogen blanket, or other gas, to prevent breakdown of the lubricant.

The pressure differential across the boot 136 will be greater than the pressure differential across a boot in a vented joint, but less than the pressure differential across a conventional sealed joint. Accordingly, the joint 120 may experience less infiltration of contaminants than a vented joint, such as joint 20, while experiencing less boot stress than a conventional sealed joint.

As illustrated, the small end 164 is a generally cylindrical first boot end portion that is sealed to the outer shaft surface 138 while permitting the first boot end portion to move generally parallel to the axis B-B relative to the shaft 128.

The material for the boot 136 is preferably a flexible material, and may be plastic, nylon or any elastomer, such as hydrogenated nitrile butadiene rubber (HNBR), chloroprene rubber, silicone, or thermoplastic elastomer (TPE).

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The invention claimed is:

1. An articulated joint comprising:
    a first rotational member;
    a second rotational member coupled with and positioned generally coaxial to the first rotational member;
    a boot, wherein the boot defines, at least in part, a joint chamber having a first volume in a first configuration, and a second volume in a second configuration, and wherein the boot is selectively deformable in response to an increase in pressure in the joint chamber to increase the volume of the joint chamber, and wherein the volume of the joint chamber is selectively changed due to, at least in part, movement of an end of the boot relative to the second rotational member;
    a scraper extending from the end of the boot; and
    a radial shaft seal interposed within a channel of the boot and the second rotational member, wherein the channel and the scraper are separated by a retaining wall, wherein the channel is spaced and separate from the scraper, thereby defining a void between the seal and the end of the boot.

2. The joint of claim 1, wherein the radial shaft seal is interference fit with the second rotational member.

3. The joint of claim 1, wherein the joint chamber is sealed such that fluids within the joint chamber are restrained from escaping the joint chamber.

4. The joint of claim 1, wherein the second rotational member is a shaft of the constant velocity joint for transmitting torque.

5. The joint of claim 1, wherein the scraper separates the boot from the second rotational member and selectively urges contaminants away from the joint chamber as the boot deforms.

6. The joint of claim 1, wherein relative movement between the end of the boot to the second rotational member permits the pressure within the joint chamber to equalize with the ambient pressure.

7. An articulated joint comprising:
    a first rotational member;
    a second rotational member coupled with and positioned generally coaxial to the first rotational member;
    a boot having a first boot end portion, wherein the boot defines, at least in part, a joint chamber having a first volume in a first configuration, and a second volume in a second configuration, and wherein the volume of the joint chamber is selectively changed due to, at least in part, relative movement of a boot end surface to the second rotational member;
    a scraper extending from the boot end portion; and
    a shaft seal interposed between the first boot end portion and the shaft, wherein the shaft seal seals between the first boot end portion and the second rotational member, and the seal selectively permits the first boot end portion to selectively move relative to the second rotational member and wherein the seal is disposed, at least in part, in a channel defined by the boot end portion, the channel and the scraper being separated by a retaining wall within the first boot end portion, wherein the channel is spaced and separate from the scraper, thereby defining a void between the seal and the end of the boot.

8. The joint of claim 7, wherein the scraper is interposed between the boot and the second rotational member for selectively urging contaminants away from the joint chamber as the boot deforms.

9. The joint of claim 7, wherein the scraper is constructed of a different material than the boot.

10. The joint of claim 7, wherein the seal is a radial shaft seal interference fit with the second rotational member.

11. The joint of claim 7, wherein the joint chamber is sealed such that fluids within the joint chamber are restrained from escaping the joint chamber.

12. The joint of claim 7, wherein the second rotational member is a shaft for transmitting torque.

13. A method of assembling an articulated joint, wherein the joint includes a first rotational member, a second rotational member having an axis, and a boot having a first boot end portion and a scraper extending therefrom, wherein the boot partially defines a sealed joint chamber, the method comprising:
    coupling the boot to the second rotational member such that the volume of the joint chamber may be changed by moving the boot generally along the axis relative to the second rotational member; and
    sealing the first boot end portion to the second rotational member such that a positive seal is disposed in a channel that is displaced laterally from the scraper, the seal being formed between the first boot end portion and the second rotational member creating a void between the seal and the scraper.

14. The method of claim 13, further comprising restricting an escape of fluids from the joint chamber during operation of the joint.

15. The method of claim 13, further comprising permitting the first boot end portion to move generally along the axis relative to the second rotational member to prevent an increase in the pressure within the joint chamber to an undesired value.

16. The method of claim 13, wherein coupling the boot to the second rotational member includes interference fitting a portion of the boot with a shaft.

17. The method of claim 13, further comprising urging the first end portion of the boot to move relative to the second rotational member by exerting a pressure on one of an inside boot surface and an outside boot surface.

18. The method of claim 17, wherein urging the first end portion of the boot includes exerting a force on a portion of the boot, wherein the force exerted on the boot exceeds a frictional force between the boot and the second rotational member.

19. The method of claim 13, wherein the second rotational member is a shaft for transmitting torque.

20. The method of claim 13, further comprising deforming at least a portion of the seal upon placing the seal between the first boot end portion and the second rotational member.

* * * * *